Figure 1:
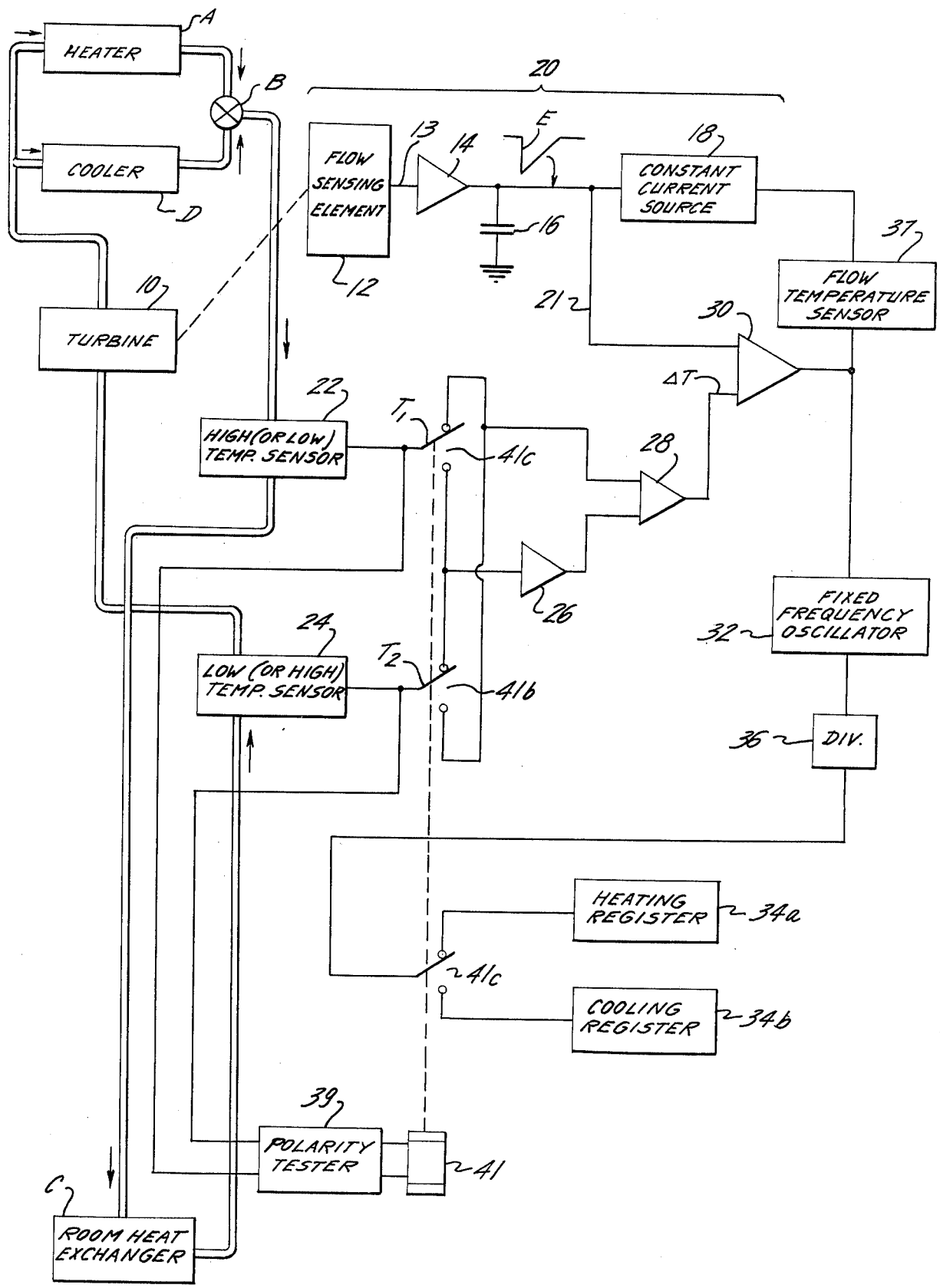

United States Patent [19]

Feller

[11] 4,245,501
[45] Jan. 20, 1981

[54] SELECTIVE HEATING AND COOLING ENERGY METER

[75] Inventor: Murray F. Feller, Dunnellon, Fla.

[73] Assignee: Wilgood Corporation, Jacksonville, Fla.

[21] Appl. No.: 958,701

[22] Filed: Nov. 8, 1978

[51] Int. Cl.³ ............................................. G01K 17/16
[52] U.S. Cl. .............................. 73/193 R; 165/11 R; 236/94
[58] Field of Search .................... 165/11; 62/125, 127; 236/94; 73/193 R, 193 A

[56] References Cited

U.S. PATENT DOCUMENTS

| 3,301,049 | 1/1967 | Meyerson | 73/193 R |
| 3,617,713 | 11/1971 | Karlsson | 73/193 R |
| 3,639,737 | 2/1972 | McKee | 73/193 R |
| 3,995,686 | 12/1976 | Laube | 165/11 |
| 4,049,044 | 9/1977 | Cohen | 165/11 |

FOREIGN PATENT DOCUMENTS 2318410  2/1977  France .................................. 73/193 R Primary Examiner—Albert W. Davis
Assistant Examiner—Margaret A. Focarino

[57] ABSTRACT

The disclosed apparatus includes separate "heat" and "cool" registers and selective switching means that connects the output of a thermal energy computer to one register or the other in accordance with use of a room heat-exchanger to produce heating or cooling. The switching means also interchanges the connections of inlet and outlet fluid temperature sensors in the computer corresponding to heating or cooling operation of the system. The temperature sensors control the switching means for automatic selective operation. The flow meter is in the outlet of the room heat-exchanger, to undergo a minimized range of temperatures under all conditions, and the computer provides correction for temperature-induced error of the flow meter.

7 Claims, 2 Drawing Figures

SELECTIVE HEATING AND COOLING ENERGY METER

BACKGROUND OF THE INVENTION

The present invention relates to apparatus for monitoring the performance of selective heating and cooling apparatus.

Apparatus for monitoring the operation of a heating system is disclosed in my copending application Ser. No. 950787 filed Oct. 12, 1978, entitled "Heat Meters". While such apparatus can be adapted to serve in a cooling system, as disclosed it is constructed to serve in one capacity only.

Some room-conditioning systems use circulating water or other liquid to provide heating or cooling effect in a room heat-exchanger, from a remote heating unit or a remote cooling unit. The present invention provides apparatus including separate "heat" and "cool" registers, common computing means, and selective switching means, organized for separately and selectively enabling the registers to monitor the delivered heating and cooling energy. The computer includes fluid temperature sensors at the inlet and outlet, respectively, of a room heat-exchanger, which also constitute the outlet and inlet fluid temperature sensors of heating and cooling equipment in a circulating-liquid system that supplies the room heat exchanger.

The preferred form of temperature sensors are polarized, and when the system operation is changed over from cooling to heating or the reverse, connection of the sensors in the remainder of the computer is reversed in coordination with selection of the appropriate "heat" or "cool" register.

It would be feasible to execute the various switching changes in the computer manually in coordination with changes in the system controls to cause heating or cooling operation. However, as a distinctive feature of the invention the switching is responsive to the temperature sensors and is thus automatically responsive to changes in system operation.

The amount of energy per unit volume of heated or cooled water or other fluid that is metered will vary with the fluid temperature, and the accuracy of the fluid meter also changes as a function of temperature as more fully discussed in my copending application on "Heat Meters" mentioned above. The fluid-flow meter is located at the return from the room heat exchanger where the temperature change between heating and cooling operation of the system is small, compared with the much wider temperature range at the inlet to the room heat exchanger. Still further, the computer here incorporates means for introducing correction for temperature-related error in metering of the fluid. The corrective means includes a temperature sensor in or near the flow meter, in any of the ways disclosed in my "Heat Meter" application which is incorporated here by reference.

The nature of the invention including the foregoing novel features and their advantages will be more fully appreciated from the following detailed description of the illustrative embodiment shown in the accompanying drawings.

Figure 2:
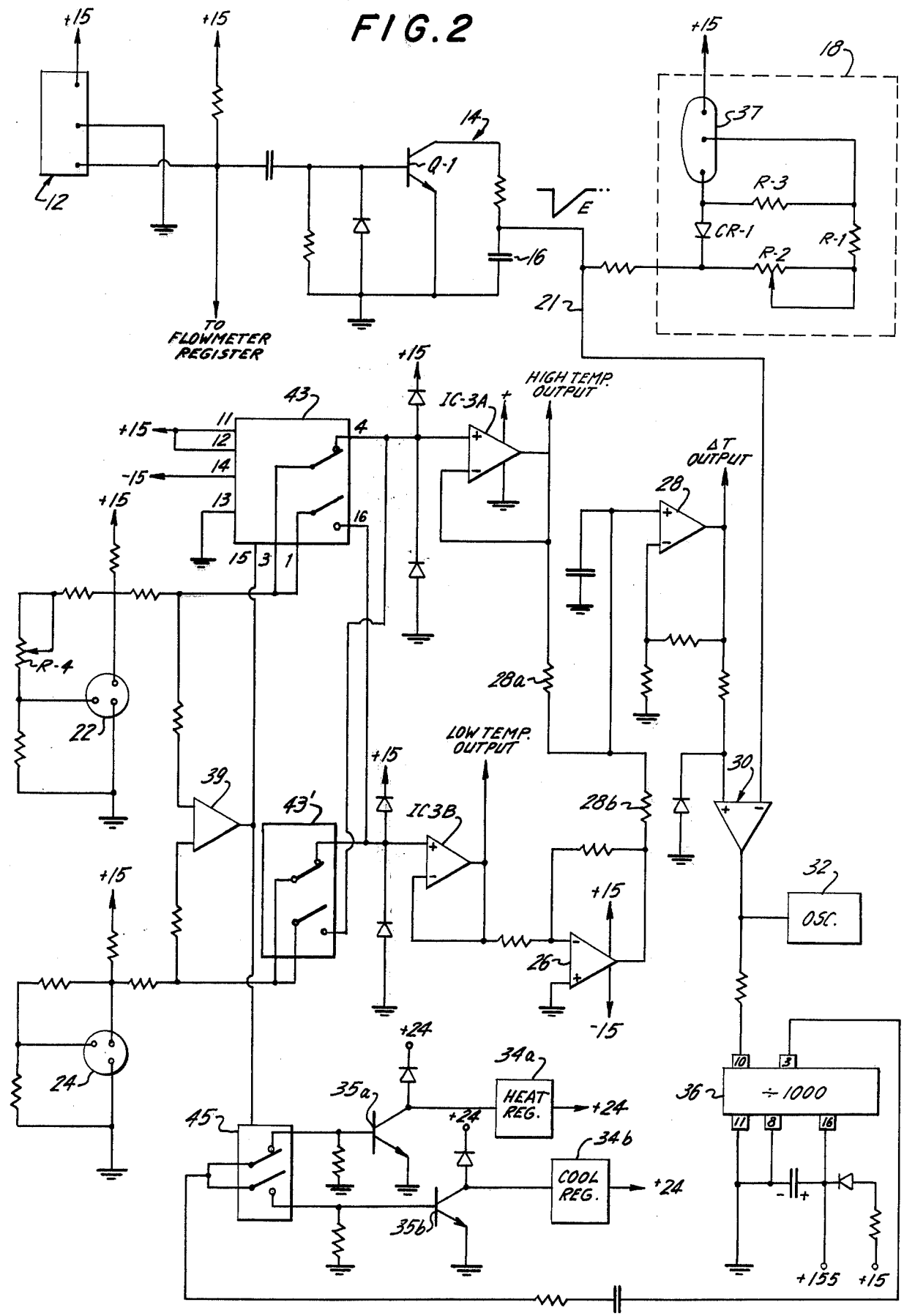

In the drawings:

FIG. 1 is a block diagram of a heating and cooling system, including an illustrative embodiment of metering equipment of the present invention; and FIG. 2 is a schematic of a presently preferred embodiment of metering equipment of the present invention.

ILLUSTRATIVE EMBODIMENT

In FIG. 1, heater A such as a solar hot-water heat exchanger or a fossile-fueled hot water furnace or a combination of both supplies heat via valve B to a room heat exchanger C. When required, the heat exchanger can provide cooled air to the room, by reversing valve B to substitute water-cooling apparatus D for heater A. The following description of the apparatus in FIG. 1 relates to the system in operation to supply heat.

The hot water supplied to the room heat exchanger returns through flow-metering means that commonly includes a turbine-type rotor 10 in the liquid path and a flow-sensing element 12 that emits electrical pulses at connection 13. The repetition rate of the pulses is proportional to the volume of fluid per unit time. These pulses are applied to high-gain amplifier 14 which acts virtually instantaneously to discharge capacitor 16 in response to each pulse. A current source 18 is provided, having the characteristic of maintaining its current constant despite variation of the voltage at its terminals. Constant-current source 18 causes recharging of capacitor 16 at a linear rate, to impart an accurately linear rising ramp voltage. The charging current is related to the value of capacitor 16 so that recharging is completed in about 80% of the time interval of the flow-rate pulses during the maximum rate of flow to be monitored, such as 30 gallons per minute. The resulting sawtooth voltage pulses E are delivered by flow-metering unit 20 at connection 21, at a repetition rate representing the volume rate of flow. The duration of the saw-tooth waves is uniform for different flow rates. Each saw-tooth wave has a straight-line ramp or charging segment, and the repetition rate represents the flow rate.

High temperature sensor 22 and low temperature sensor 24 are located in the fluid-flow passage at the hot inlet and the cold outlet points of a heat exchanger, such as a series of room heaters. The electrical output signals of these temperature sensors are made equal at a calibration temperature, and they vary linearly per degree temperature change. The difference between the high- and low-temperature signals is taken by means diagrammatically represented by unity gain inverting amplifier 26 and differential amplifier 28 to yield a temperature-difference signal $\Delta T$.

Comparator 30 acts as a gate, producing output at the start of the charging ramp of each saw-tooth signal on connection 21 applied to one input of the comparator and terminating when that signal exceeds the temperature-difference signal at the other input of comparator 30. The comparator output switches oscillator 32 on and off, or gates the oscillator output on and off. Trains of oscillator pulses are transmitted to digital register 34a (or 34b) through an optionally included divider 36, such as a 1000:1 counting circuit.

In registering the number of heat units per unit of volume of water that is metered, a feature of the invention in my "Heat Meters" application, Ser. No. 950787, filed Oct. 12, 1978 resides in recognition that multiplication of factors representing the metered volume of fluid by the temperature change between the inlet and the outlet of the heat exchanger will yield an erroneous result, both because of changes in specific heat of the metered water at different temperatures and because even excellent flow meters have a small temperature-dependent metering error. That feature is especially important here where the water passing through the flow meter may be heated or cooled. Correction or compensation is introduced for the temperature-dependent error. A temperature sensor 37 is exposed to the temperature of the fluid flowing through metering device 10, either being immersed in the fluid path or assembled to a portion of the metering device that is in direct, intimate heat-transfer relation to the fluid. Although having a separate designation in FIG. 1, this temperature sensor can actually be one of the temperature sensors 22 or 24, or it can be an additional temperature sensor as described in that copending application. As a practical consideration, using a separate temperature sensor may avoid circuit complications.

Temperature sensor 37 is connected to, or is part of, constant current source 18, to introduce temperature dependent adjustment of the value of the charging current to capacitor 16. This modifies the slope of the ramp of pulses E.

For example, if there is an increase in water temperature at sensor 37 and correspondingly a reduction in density of the water or other fluid, each unit of volume will represent fewer heat units than the same volume of fluid (or pulse) at the temperature prevailing before the increase. For the same temperature-difference signal input to differential amplifier 30, there should be a shorter "on"-time of oscillator 32 at the higher temperature of the metered water. Hence, when there is an increase in temperature of water (for example) at the flow sensing element 12 and assuming there is no temperature-dependent error in the operation of metering device 10, constant current source 18 is adjusted to provide a corrective increase in the charging-current slope of saw-tooth pulses E. This correction is suitably modified to provide correction for the temperature-dependent error in flow-metering device 10.

Register 34a (or 34b) accumulates a reading representing the number of heat units added (or extracted) by the heat exchanger C over a time interval. To determine the rate of heat absorbed or extracted in the heat exchanger, the reading of a register 34 can be taken in a given time interval. In a practical application, registers 34a and 34b are scaled to read in 1000-BTU units and to accumulate the heating and cooling measurement over a period of many months.

The system can be set up to operate in the foregoing manner when valve B is set to supply heated water to the room heat exchanger. In that event, polarity tester 39 that responds to the relation between the outputs of sensors 22 and 24 allows relay means 41 to remain deenergized. Its contacts 41a, 41b and 41c establish the connections required during heater operation and connect heating register 34a. Upon reversal of the polarity of the relative outputs of the temperature sensors, polarity tester 39 reverses relay means 41. The proper relative inputs to differential amplifier 28 from the temperature sensors 22 and 24 are maintained, and the cooling register 34b is substituted for the heating register. The substitution of the registers and the interchange of the high- and low-temperature sensors is wholly automatic.

FIG. 2 represents an illustrative yet highly successful circuit for implementing that portion of FIG. 1 represented by numerals 12 through 41. Many components shown in the drawing are not described individually in the interest of brevity. They are represented by customary symbols, they have their normal functions in the circuit shown, and they are to that extent incorporated in this specification. Flow metering device 10 of FIG. 1 includes a liquid-driven rotor carrying a small magnet. An example of such a flow-sensor is more fully disclosed in my copending application Ser. No. 935,562 filed Aug. 21, 1978 entitled, "Rotation Sensor." The magnet affects a Hall-effect sensor 12 in FIG. 2. This Hall-effect sensor and related circuitry is a commercially available device, Type UGN 3020 T, made by Sprague Electric Co. Transistor Q-1 is normally blocked. When a driving pulse is received from sensor 12, transistor Q-1 (part of circuit 14) abruptly discharges capacitor 16.

Device 37 and 38 constitute a temperature-varied constant-current integrated circuit, for example a commercially available temperature sensor Type LM 334Z made by National Semiconductor Corp. The entire circuit 18 is epoxied to flow metering device 10 for intimate exposure to the fluid temperature. The value of the current carried by constant-current circuit 18 is determined by the values of the resistors in its network, selected to determine the slope and time duration of the charging segment of pulse B. Rectifier CR-1 responds to the same temperature as that which affects device 37 but the temperature coefficients of these devices are opposites. The current supplied by device 37 increases with temperature. Resistor R-3 determines the level of the constant current of device 37. The temperature variation of that constant current is modified by resistors R-1 and R-2 in combination with rectifier CR-1. Temperature-adjusted constant current source 18 causes capacitor 16 to charge linearly and thus causes the voltage across capacitor 16 to increase linearly with time.

Temperature sensors 22 and 24 (which may be commercially available integrated circuits Type LM 335H made by National Semiconductor Corp.) are temperature-adjusted constant-voltage devices that sense the high and low temperatures of the system. They are selected to track, or yield equal output at identical temperatures over the range of interest. Using resistor R4, these temperature sensors are adjusted to yield balanced output when the inlet and outlet temperatures of the heat exchanger are equal. Unity-gain buffer amplifiers IC-3A and IC-3B in an example provide about 10 millivolts per °C. output. These amplifiers couple the outputs of sensors 22 and 24 to a differencing circuit including an inverting operational amplifier 26 and resistors 28a and 28b. The junction of these resistors is connected to the "plus" input of amplifying comparator 28. With 10 mv./°C. output of amplifiers IC-3A and IC-3B, the signal is 5 mv. per degree C. at the junction of resistors 28a, 28b over a 100° C. temperature range. With a stabilized accurate gain of 20, the output of amplifier 28 has a range of 0 to 10 volts for a 0° to 100° C. range of temperature difference between inlet and outlet temperatures of the heat exchanger.

Comparator 30 (a high-gain amplifier with little or no feedback) turns "on" the output of constant-frequency oscillator 32 for all values of voltage across capacitor 16 (represented by the slant segment of pulse E) from zero to that value which equals the output signal from amplifier 28. The number of pulses E per minute varies with the rate of flow, and the duration of output pulses from comparator 30 varies with the temperature difference. Therefore the average "on" time at the output of oscillator 32 varies as the product of the temperature-compensated volume of liquid flow and temperature difference. The output pulses of the oscillator are divided by 1000 by divider 36 in an example. The divided output is supplied to through driver 35 to an electronic digital register 34 which has a sufficient capacity to accumulate the heat units (divided by 1000) absorbed by the room heat exchanger during a metering interval such as a month.

The circuit shown is simplified, as compared to that of an actual practical heat meter in some respects. Regulated direct-current supply means is omitted, as are spike-suppressing diodes commonly used to avoid erroneous operation that might result from spurious pulses. The operation of the entire circuit could be inaccurate if the supply voltage were low, so that an operation-suppressing circuit responsive to under voltage can be included. Those features are omitted as not germane to the essential circuit for implementing the invention.

In FIG. 2, polarity tester 39 is a comparator that sharply reverses its output when its relative input potentials reverse. Commercially available solid-state devices 43 and 43' replace contacts 41a and 41b and their activating coils. These devices may be Type IH 5042. Correspondingly, contacts 41c and their activating coil of FIG. 1 may be replaced by another solid-state device 45, e.g. Type IH 5042, made by Intersil, Inc., Cupertino, California.

Devices 43 and 43' respond to polarity tester 39 to maintain the proper relative polarities which the circuit of IC3A, IC3B, etc. are designed to receive. Relaying device 45 alternatively supplies output from the oscillator 32 and divider 36 to heating register 34a or cooling register 34b through switching transistors 35a and 35b, respectively, under control of the output of polarity tester 39. Consequently, when the relative outputs of temperature sensors 22 and 24 reverse due to changeover of system operation from heating to cooling (or the reverse) operation of switching means 43, 45 is automatically controlled by comparator 39 in response to the temperature sensors.

What is claimed is:

1. Apparatus for metering the heating energy and the cooling energy in fluid supplied by heating and cooling equipment from time to time to a heat exchanger, including a heating register and a cooling register, common monitoring means including (a) a first fluid temperature sensor for providing output that represents the temperature of the fluid supplied to the heating and cooling equipment; (b) a second fluid temperature sensor for providing output that represents the temperature of the fluid supplied to the heat exchanger; (c) flow-metering means for providing output that represents the quantity of fluid supplied to the heat-exchanger; and (d) means for deriving the product of the output of said flow-metering means and the difference between the outputs of said fluid temperature sensors, and output switching means for delivering the output of said common monitoring means selectively to said heating register and said cooling register.

2. Apparatus as in claim 1 wherein said common monitoring means includes means for adjusting its output in relation to temperature-induced error of said flow-metering means.

3. Apparatus as in claim 1 for use in a system in which the fluid is liquid that is circulated through the heat exchanger and the heating or cooling equipment, wherein the flow metering means is located in the liquid return path to the heating or cooling equipment for minimizing temperature-induced error of the flow-metering means.

4. Apparatus as in claim 1, wherein said common monitoring means includes means for interchanging the output connections of the first and second fluid temperature sensors in coordination with the operation of said output switching means.

5. Apparatus as in claim 1 including testing means responsive to said first and second fluid temperature sensors for controlling the selective delivery of the output switching means.

6. Apparatus as in claim 4 including testing means responsive to said first and second fluid temperature sensors for controlling the output switching means for effecting selective delivery of the output of the common monitoring means to the registers, and for coordinately controlling the interchanging of the output connections of the first and second fluid temperature sensors.

7. Apparatus as in claim 6 for use in a system in which the fluid is liquid that is circulated through the heat exchanger and the heating or cooling equipment, wherein the flow metering means is located in the liquid return path to the heating or cooling equipment for minimizing temperature-induced error of the flow-metering means.

* * * * *